Dec. 4, 1951 G. T. LAMPTON 2,577,336
METHOD OF MAKING PROPELLER BLADES
Original Filed April 23, 1943 3 Sheets-Sheet 1

INVENTOR
Glen T. Lampton
BY Harris G. Luther
Attorney

Dec. 4, 1951    G. T. LAMPTON    2,577,336
METHOD OF MAKING PROPELLER BLADES
Original Filed April 23, 1943    3 Sheets-Sheet 2
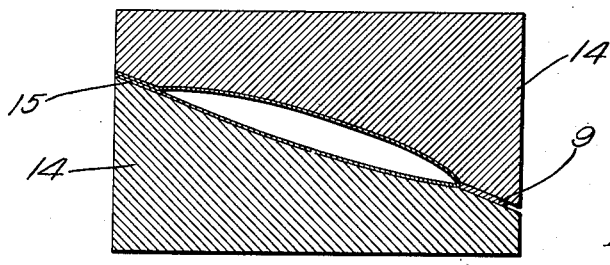
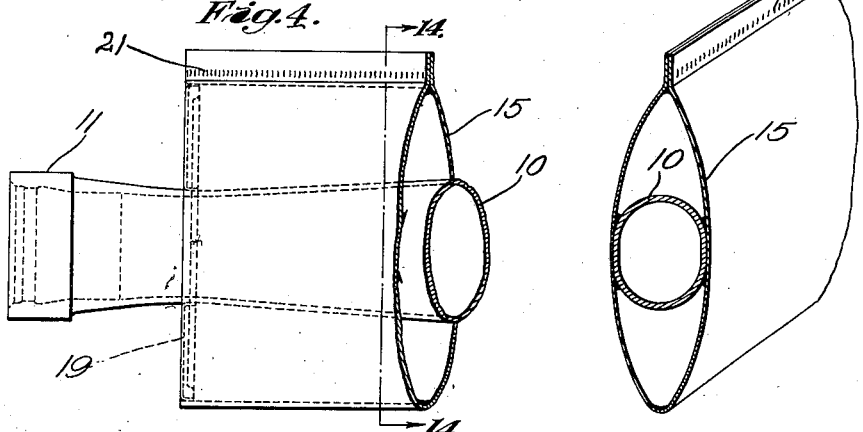
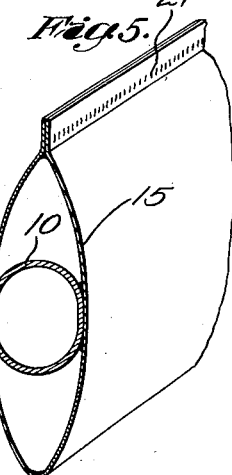
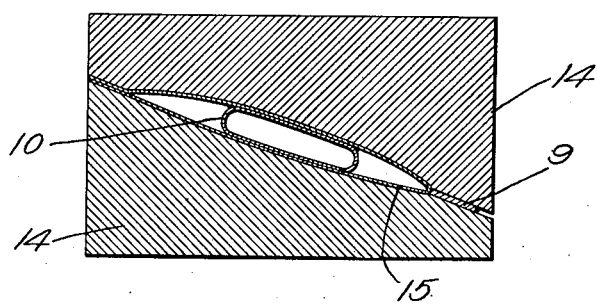
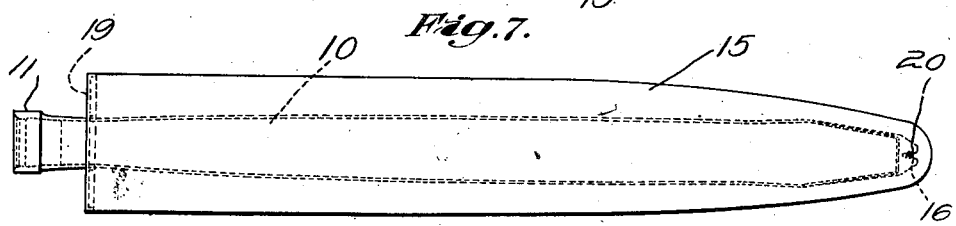
INVENTOR
Glen T. Lampton
BY Harris G. Luther
Attorney Dec. 4, 1951  G. T. LAMPTON  2,577,336
METHOD OF MAKING PROPELLER BLADES
Original Filed April 23, 1943  3 Sheets-Sheet 3

Patented Dec. 4, 1951

2,577,336

UNITED STATES PATENT OFFICE 2,577,336

METHOD OF MAKING PROPELLER BLADES

Glen T. Lampton, West Hartford, Conn., assignor to United Aircraft Corporation, East Hartford, Conn., a corporation of Delaware Original application April 23, 1943, Serial No. 484,254, now Patent No. 2,511,858, dated June 20, 1950. Divided and this application June 28, 1947, Serial No. 757,845

5 Claims. (Cl. 29—156.8)

This application is a division of U. S. Application Serial No. 484,254, filed April 23, 1943, by Glen T. Lampton for Method of Making Propeller Blades, and issued June 20, 1950 as Patent No. 2,511,858.

This invention relates to a process of making an improved form of hollow all-metal blade for airplane propellers.

An objection of the invention is to provide an improved method of performing an outer or airfoil member for an airplane propeller blade.

With the above and other objects and advantages in view the invention includes the steps in the process of manufacturing a hollow all-metal aeronautical propeller blade set forth in the following specification and illustrated in the accompanying drawings which illustrate what is now considered to be the preferred process of carrying out the invention.

In the accompanying drawings, annexed hereto and forming a part of this specification, I have shown the various steps in the preferred process of making a particular form of hollow all-metal propeller blade, but it will be understood that the invention can be otherwise carried out and the drawings are not to be construed as defining or limiting the scope of the process; the claims appended to this specification being relied upon for that purpose.

In the drawings:

Fig. 3 is a transverse sectional view of the outer member in position within the forming dies for its preliminary forming operation after being centrally and longitudinally folded.

Fig. 4 is a fragmentary longitudinal view showing the shank end of the tubular and outer members in relative position for the final and permanent uniting operation.

Fig. 5 is a sectional view taken on an oblique transverse plane through line 14—14 of Fig. 4 and showing the joints between the airfoil and tubular members, and the welded or other seam along the trailing edge of the outer member prior to the final edge trimming operation.

Fig. 6 is a transverse sectional view of the assembled blade member shown in Fig. 5 within the complete forming die, and Fig. 7 is a longitudinal view of the completed blade made in accordance with the present invention.

Fig. 8 is a view looking down on a folded sheet as folded by the platen and ram of Fig. 2.

Fig. 9 is a side view of the deformed sheet, a portion of which is shown in Fig. 1, after the preliminary forming and before the folding and with the flanged edge portions removed for clarity.

In the above-mentioned drawings there has been shown but one complete blade made according to the present process of forming a form of hollow all-metal propeller blade which is now deemed preferable. It is to be understood, however, that changes and modifications may be made within the scope of the appended claims without departing from the spirit of the invention.

Briefly, and in its preferred aspect, the process comprising the present invention may include the following principal steps: conforming the outer member substantially to aerodynamic form; and finishing the blade to predetermined outline and airfoil sections.

The process of forming the outer or shell member 15 will now be described.

Figure 2:
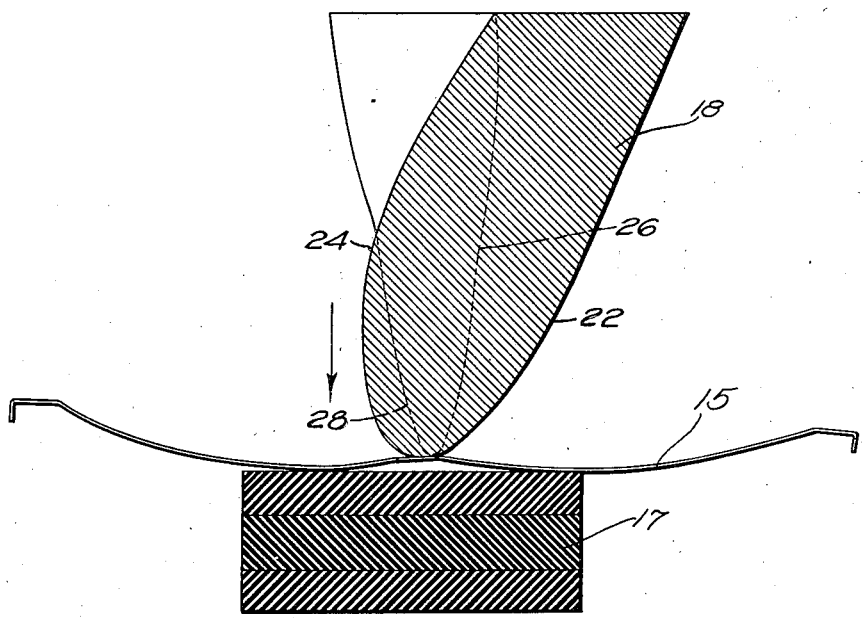
Fig. 2 is an end view of the outer member shown in Fig. 1 in position for being centrally and longitudinally folded, the member being shown in relation to the platen and ram of a suitable press.
Figure 1:
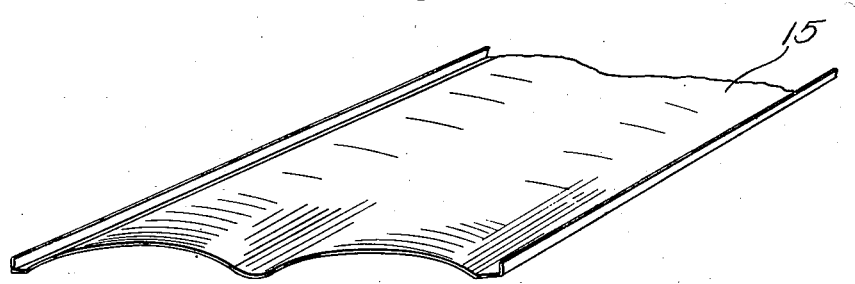
Fig. 1 is a perspective view of an intermediate portion of the outer or airfoil member of the blade partially formed and prior to being centrally folded, the surfaces shown in the figure forming the outside surfaces of this outer or airfoil member.

The shell member 15 comprises initially a thin flat sheet of metal first preliminarily formed between suitable conforming dies (not shown) to form the opposite sides or faces of the airfoil section opened out approximately 180°. This partly formed member 15, a portion of which is shown in Fig. 1, may then have its outline cut to a predetermined contour by any appropriate cutting means (not shown). The sheet thus partially formed and with its edges shaped to a predetermined periphery is then folded centrally and longitudinally upon itself to superimpose the pressure and camber surfaces (which are those shown in Fig. 1) directly opposite each other. This central longitudinal bending operation may be performed by means of a press having a compressible platen such as a thick body of rubber 17. The plunger 18 of the press may have its work engaging surface shaped as shown to accommodate the opposite surfaces of the outer member 15 after being doubled upon themselves. Thus as shown in Fig. 2, surfaces 22 and 24 are shaped to accommodate the deformation of the sheet 15 forming the face and camber sides respectively adjacent the shank end of the blade in the finished blade. Surfaces 26 and 28 are shaped to accommodate the deformation of the sheet 15 forming the face and camber sides respectively adjacent the tip portion of the finished blade. From Fig. 2 it is apparent that the fold line forming the leading edge portion of the finished blade is a substantially straight line and that the plunger 18 incorporates a twist or pitch distribution between the shank portion and the tip portion to accommodate the deformation made in sheet 15 to provide such twist, thus providing in the initial steps of forming the twist which is to appear in the finished blade. The fold thus formed extends centrally of the sheet along the edge of the shank and intermediate portions of the blade and in the finished blade forms a portion of the leading edge of the blade. A propeller blade to be efficient must have a twist, i. e., the blade chord at the tip must have a smaller angle to the propeller disc than the chord at the shank end of the blade. This is so because while all parts of the blade are advancing bodily forward in the direction of travel of the airplane at the same speed, the portion of the blade near the tip travels a much further distance in a circular path than the portion near the shank. This twist of the blade is shown in the forming die 18 in Fig. 2. In order to impart this twist, or as it is called this pitch distribution, to a shell made of a thin flat sheet, it is necessary to first deform the sheet by forming depressions corresponding to the finished camber and face sides incorporating this pitch distribution and then bend or fold the sheet to bring the two sides into juxtaposition. All attempts to impart all of this twist to the shell after it has been folded resulted in a wrinkled surface from which it was not possible to remove the wrinkles. This may be due to the fact that as shown the finished blade has flat or convex exterior surfaces and is much wider than it is thick giving a relatively long and narrow cross section as shown in Figs. 3—7. Any twist imparted to this hollow thin flat tube will naturally result in wrinkles. However, if the flat sheet is deformed to provide the camber and face shapes including the blade twist in the flat sheet, it may then be folded to form the leading edge at the fold and the folded sheet will have the twist as well as the camber and face shapes incorporated therein without the formation of wrinkles. The plunger 18 and pad 17 fold the sheet 15 as far as possible and still leave room to withdraw the plunger. After the plunger is withdrawn the folded sheet appears as in Fig. 8. In preparing to weld the peripheral edges of the folded sheet, the free edges of the folded sheet are then brought together in any desired manner usually by manual manipulation. The entire periphery of the blade except along this folded portion after this bending operation has its edges welded or otherwise integrally united electrically just beyond the finished edges of the blade as indicated at 21 in Fig. 5.

With the outer member 15 thus preliminarily formed and folded, and with its peripheral edges welded by the seam weld 21 as above described there is formed an enclosure, pressure tight except at its open shank end. Within this open end of the outer member 15 a bulkhead 19 may be temporarily inserted and secured in pressure tight relation therein, there being a suitable opening therein for the attachment of pressure applying means. The outer member 15 at this step in the process is only roughly formed in outline and the seam welding 21 at its periphery is so positioned that it will be outside the final outline or contour of the blade. With this member 15 so formed and with the edges along its opposite sides seam welded together the member 15 is inserted within the space between the halves of the dies 14 shown in Fig. 3. By means of this die the member 15 is conformed substantially to its final airfoil form. During this conforming operation within the dies 14, spacing means 9 are inserted along one of the longitudinal edges of the die 14 at which the front or leading edge of the blade is disposed. This spacing means 9 may comprise a metal strip having twice the thickness of the material of which the member 15 is made. On the opposite edge, the lateral extensions of the folded and shaped sheet 15 beyond the final outlines of the blade, form the means to properly space the dies. Closing of the die halves 14 with the admission of pressure to the interior of the shell member 15 conforms this member 15 closely to the outline of the dies, slightly spaced apart as indicated above. As in the process of conforming the tubular member 10 the shell 15 may be heated to a suitable working temperature during the forming operation.

With the outer member conformed to substantially its final form, the edges previously seam welded at 21 may be permanently united, preferably by copper welding their peripheral edges. As this process is well known, a detailed description is not thought to be necessary. It will suffice to state that copper within the member 15 heated in a reducing atmosphere to a temperature above its melting point is allowed to flow between the walls of the outer member just within the seam weld 21 so that upon cooling a solid copper joint or weld will be formed inside this member 15 throughout its periphery. This joint or weld takes the form of a fillet adjacent and within the periphery of the blade where the edges are united.

With the outer member 15 so formed by dies 14 the temporary bulkhead 19 at the shank end is removed and the tubular or inner member 10 inserted within this open end of the outer member. To center this inner member 10 relative to the outer member 15 so that the tubular member 10 may extend exactly centrally or axially therethrough, the shank end of the outer member 15 may have another bulkhead 19 inserted therein closely fitting around the shank end of the tubular member 10.

To permanently unite the tubular member 10 to the outer member 15 while retained in central position therein as described above, the assembled members preferably are dipped into a tank of melted solder or other material having a lower melting point than the copper or other brazing material used in permanently uniting the peripheral edges of the outer member 15. Small openings may be provided in the outer member adjacent the blade tip by means of which the melted solder may enter the space between the tubular and outer members. This material, after filling, may be drained slowly from this interior leaving the solder to form a firm joint between the contacting surfaces of these members 10 and 15 and serving to retain these members permanently together. During this operation the surfaces of member 15 may be compressed resiliently against the surface of the tubular member, and, if desired pressure may be admitted within the tubular member 10.

With the two members 10 and 15 permanently united as above described the outer member 15 may be conformed to any predetermined airfoil shape. The periphery of this outer member may be trimmed in a manner to cut away all of the seam welding.

It is to be understood that the invention is not limited to the specific steps in the process herein illustrated and described, but may be carried out in other ways without departure from its spirit as defined by the following claims.

I claim:

1. The method of forming an airfoil shaped shell for a hollow propeller blade varying in shape throughout its length and incorporating a twist between its shank and tip ends and having a substantially straight leading edge which comprises, deforming a substantially flat sheet to produce depressions therein having substantially the shape of the face and camber sides of the finished shell including said twist, folding said shell on a substantially straight line between said depressions bringing the edge portions of said folded sheet into contact, and welding said edge portions along a line adjacent to the desired final outline of said blade.

2. The method of forming a propeller blade having an airfoil cross section with face and camber sides and having a twist lengthwise of the blade and having a substantially straight leading edge which comprises, deforming a substantially flat sheet to produce depressions therein having substantially the shape of the face and camber sides of the finished blade including said twist, folding said sheet along a substantially straight line between said depressions, bringing the edge portions and one end of said sheet into contact, and welding said edge portions and end portion along a line adjacent to the desired final outline of said blade to form an airtight shell, finish shaping said folded sheet to the desired airfoil shape and twist between dies while maintaining the interior of said shell under pressure.

3. The method of forming a propeller blade having an airfoil cross section with face and camber sides and having a twist lengthwise of the blade which comprises, deforming a substantially flat sheet to produce depressions therein having substantially the shape of the face and camber sides of the finished blade including said twist, folding said sheet along a line between said depressions, bringing the edge portions and one end of said sheet into contact and welding said edge portions and end portion along a line adjacent to but outside of the desired final outline of said blade to form an airtight shell, finish shaping said folded sheet to the desired airfoil shape and twist between dies while maintaining the interior of said shell under pressure, further uniting said folded sheet at the weld by flowing melted metal from the inside of said shell toward said welded line, and completing the shaping of the blade by removing welding to give the blade its final airfoil shape.

4. The method of forming a propeller blade which comprises, folding a sheet about a substantially central longitudinal line, seam welding one side and one end of said folded sheet along a line adjacent to but outside of the desired final outline of said blade to join the opposite sides of said folded sheet and form a substantially airtight envelope, shaping said envelope to substantially airfoil shape in a die while maintaining pressure within said envelope flowing metal along the line of said weld on the inside of said shell to further join the opposite sides of said folded sheet, and trimming away said welded portion to bring said envelope to the final blade form.

5. In the process of making a hollow aeronautical propeller blade having an airfoil cross section with face and camber sides and having a twist lengthwise of the blade and a substantially straight leading edge the steps of, forming depressions in a sheet of metal of uniform thickness to provide portions preformed into portions of the camber and flat sides of a blade including said twist, folding said sheet along a line between said preformed portions to form the blade leading edge and bring peripheral edges of said sheet together, welding together the peripheral edges of said folded sheet, elevating the temperature of said folded sheet, and then completing the shaping of said folded and welded member at elevated temperature to airfoil shape between dies and to a predetermined outline with the preformed portions including said twist located in the camber and flat sides of the blade.

GLEN T. LAMPTON.

REFERENCES CITED

The following references are of record in the file of this patent:

UNITED STATES PATENTS

| Number | Name | Date |
|---|---|---|
| 412,278 | Lee | Oct. 8, 1889 |
| 1,346,508 | Olhovsky | July 13, 1920 |
| 1,805,283 | Hammerstrom | May 12, 1931 |
| 1,817,556 | Hamilton | Aug. 4, 1931 |
| 1,927,247 | Squires | Sept. 19, 1933 |
| 2,050,142 | White | Aug. 4, 1936 |
| 2,108,209 | Reilly | Feb. 15, 1938 |
| 2,280,337 | McKee | Apr. 21, 1942 |
| 2,293,768 | Schaefer | Aug. 25, 1942 |
| 2,341,784 | John | Feb. 15, 1944 |

FOREIGN PATENTS

| Number | Country | Date |
|---|---|---|
| 770,908 | France | Sept. 24, 1934 |